United States Patent
Feekin

(10) Patent No.: US 10,844,832 B1
(45) Date of Patent: Nov. 24, 2020

(54) WATER CURRENT ENERGY GENERATOR

(71) Applicant: Richard Feekin, Billings, MT (US)

(72) Inventor: Richard Feekin, Billings, MT (US)

(*) Notice: Subject to any disclaimer, the term of this patent is extended or adjusted under 35 U.S.C. 154(b) by 0 days.

(21) Appl. No.: 16/773,136

(22) Filed: Jan. 27, 2020

(51) Int. Cl.
*F03B 13/24* (2006.01)
*F03B 13/10* (2006.01)
*F03B 13/20* (2006.01)
*F03B 11/02* (2006.01)
*F03B 17/06* (2006.01)

(52) U.S. Cl.
CPC ............. *F03B 13/24* (2013.01); *F03B 11/02* (2013.01); *F03B 13/10* (2013.01); *F03B 13/20* (2013.01); *F03B 17/065* (2013.01); *F05B 2210/11* (2013.01); *F05B 2240/14* (2013.01); *F05B 2240/97* (2013.01)

(58) Field of Classification Search
CPC .......... F03B 13/10; F03B 13/20; F03B 13/24; F03B 17/065
USPC ........................................ 290/42, 43, 53, 54
See application file for complete search history.

(56) References Cited

U.S. PATENT DOCUMENTS

| | | | |
|---|---|---|---|
| 1,368,454 A * | 2/1921 | Rebman | F03B 17/063 416/85 |
| 1,441,361 A * | 1/1923 | Lindsey | F03B 17/061 416/85 |
| 2,730,631 A * | 1/1956 | Dandini | F03B 17/063 290/54 |
| 3,927,330 A | 12/1975 | Skorupinski | |
| 3,928,771 A | 12/1975 | Straumsnes | |
| 3,993,913 A * | 11/1976 | Dickman | E02B 9/08 290/53 |
| 4,239,976 A | 12/1980 | Collard | |
| 4,256,970 A * | 3/1981 | Tomassini | F03B 13/10 290/53 |
| 4,725,195 A * | 2/1988 | Wiggs | F03B 17/063 415/121.2 |
| 7,045,912 B2 | 5/2006 | Leijon et al. | |
| 7,279,803 B1 | 10/2007 | Bosley | |
| 8,102,068 B1 * | 1/2012 | Gutekunst | F03B 17/063 290/42 |
| 9,534,579 B2 * | 1/2017 | Van Rompay | F03B 17/063 |
| 2016/0141986 A1 * | 5/2016 | Bergman | F03B 7/003 290/43 |
| 2016/0141987 A1 * | 5/2016 | Bergman | H02P 9/06 290/43 |

OTHER PUBLICATIONS

The PowerWheel. Product Listing [online]. © Copyright 2020 Educational Innovations, Inc. [retrieved on May 20, 2019]. Retrieved from the Internet: URL: <https://www.teachersource.com/product/1526/energy-green?gclid=Cj0KCQjwwODIBRDuARIsAMy_28VA2G4G_5tHkbO6B1BvOQD9v7NouLAfvCWdIMZE-atphGYjGk9-gZZYaAhDvEALw_wcB#prod-video>.

* cited by examiner

*Primary Examiner* — Sean Gugger
(74) *Attorney, Agent, or Firm* — Cramer Patent & Design, PLLC; Aaron R. Cramer

(57) ABSTRACT

A water current energy generator comprises a barrel configured to rotate in a water current and a pair of air compressors secured on either side of the barrel. As the barrel spins, the air compressors are actuated and compress air into a cylinder. The compressed air is then capable of being accessed by means of a pneumatic hose.

20 Claims, 5 Drawing Sheets

WATER CURRENT ENERGY GENERATOR

RELATED APPLICATIONS

None.

FIELD OF THE INVENTION

The present invention relates generally to an energy generator and more specifically to a water current energy generator.

BACKGROUND OF THE INVENTION

From the beginning of time, mankind has relied on various sources of energy to survive. These sources have included wood, coal, oil, wind power, and nuclear energy to just name a few. However, just about all of these sources of energy have one drawback or another. These drawbacks range from pollution, to natural resource depletion, and the like. Once captured, these energy sources are transformed into other forms of energy such as heat, rotational motion, and even pressurized air. As these transformation processes are not one-hundred present efficient, even more energy is wasted. Accordingly, there exists a need for a means by which pressurized air can be produced in an energy efficient means without the drawbacks as described above. The development of the Water Current Energy Generator fulfills this need.

SUMMARY OF THE INVENTION

In view of the foregoing references, the inventor recognized the aforementioned inherent problems and observed that there is a need for an energy delivery device which comprises a large central drum floating partially submerged on a water surface. An outer cylindrical surface of the drum is provided with a plurality of ridges to capture movement from moving water. The device also comprises a central axle receiving the large central drum allowing the large central drum to rotate on freely the central axle. The central axle originates at a first air compressor traversing the interior of the drum and terminating at a second air compressor. The device also comprises a pair of air compressors which are directly mechanically coupled in an in-line manner to the central axle. The air compressors are each mounted to a base plate located at the bottom. The base plates are subsequently mounted to an individual frame bottom member The device also comprises a frame assembly mounting the pair of air compressors. The frame assembly includes a pair of frame bottom members. Each of the pair of frame bottom members have a first end attached to a bottom end of an individual frame side member. The top end of the pair of individual frame side members are attached to an outer end of an individual frame upper member while an inner end of each of the frame upper members are conjoined with an anchor ring to allow for tethering to a shore anchored object. The device also comprises a flexible compressed air hose which is routed from an output of each of the pair of air compressor to a top of the frame assembly near the anchor ring. The flexible compressed air hose from both of the air compressors are routed to a tee fitting near the anchor ring. The large central drum is located on the body of moving water and is tethered via the tethering line to a stationary land object. The flexible compressed air hose is continually routed along the tethering line, secured, and terminates at an air pressure tank. Air generated by the air compressors is stored in the air pressure tank for future use, and/or when the large central drum is not rotating such as when the body of moving water is calm.

A plurality of reinforcing ribs may be added on an interior of a drum side face to afford greater structural stability. The reinforcing ribs may also be added on an exterior of the drum side face to afford greater structural stability. The large central drum may be made of a hollow plastic material and be in the range of 18 inches to 36 inches in diameter.

The base plates may be mounted to an individual frame bottom member by bolting that allows for easy removal of the air compressors in the event of repair or replacement. The pair of compressors may be individually coupled on both sides of the large central drum. A plurality of interior components of the air compressors may be mirrored so as to both produce compressed air while the first air compressor is driven in a clockwise manner and the second air compressor is driven in a counter-clockwise manner. The pair of frame side members may be oriented parallel to each other.

The frame upper members may each be attached at an angle from the frame side members at thirty degrees to meet the needs of an individual. The frame assembly may include a protective coating to prevent corrosion in a water-based environment or be made of material selected from the group consisting of steel material, aluminum material, or stainless steel material.

The tee fitting may continue along a tethering line. The tethering line may be a nylon rope. The flexible compressed air hose may be secured to the frame upper members and the tethering line via a plurality of nylon zip ties or may secured to the frame upper members and the tethering line via a plurality of stainless steel straps. The flexible compressed air hose may be continually routed along the tethering line, secured by a securing means, and terminates at an air pressure tank. Air generated by the air compressors may be stored in the air pressure tank for future use, and/or when the drum is not rotating when the body of moving water is calm.

A quantity of air pressure may be verified by an air pressure gauge and the resultant air pressure is then piped to an air delivery station and an air driven motor. The air delivery station may be provided with a flexible hose for delivery of pressurized air, rotational mechanical power output of the air driven motor is then used to drive an electrical generator. The electrical power output of the electrical generator may then be routed to an electrical power delivery station which produce both AC and DC power for usage. The DC power output may also directed to a storage battery to allow for stored electrical energy when the air driven motor and the electrical generator is not operational.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
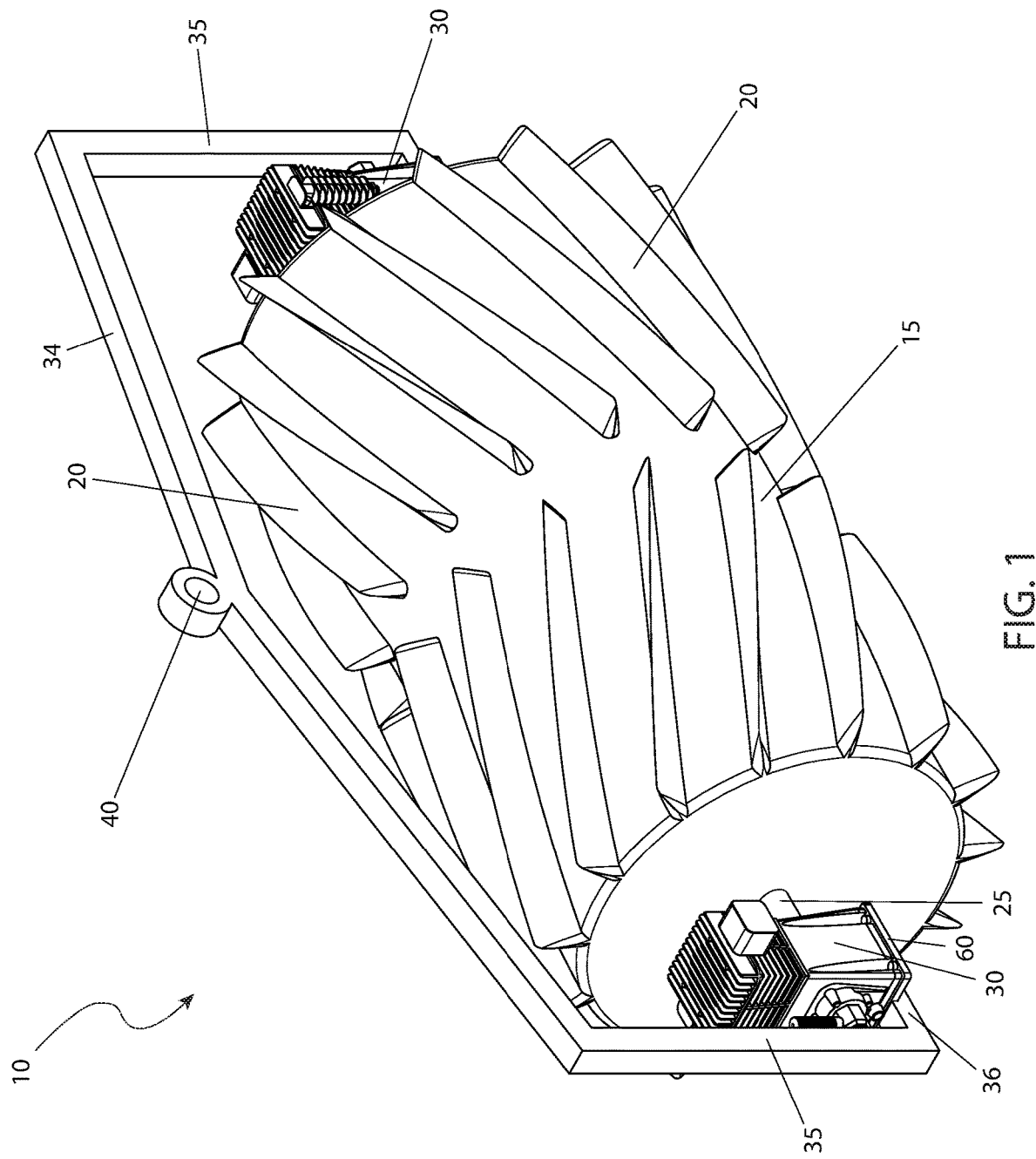
FIG. 1 is a perspective view of the water powered air-based energy delivery device 10, according to the preferred embodiment of the present invention.

DESCRIPTIVE KEY 10 energy delivery device
15 drum
20 ridge
25 central axle
30 air compressor
34 frame upper member
35 frame side member
36 frame bottom member
40 anchor ring
45 flexible compressed air hose
50 reinforcing rib
55 drum side face
60 base plate
65 tee fitting
70 tethering line
75 securing means
80 body of moving water
85 stationary land object
90 air pressure tank
95 air pressure gauge
100 air delivery station
105 air driven motor
110 flexible hose
115 electrical generator
120 electrical power delivery station
125 storage battery
130 charge controller
135 inverter
140 DC power receptacle
145 AC power receptacle

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the energy delivery device 10, according to the preferred embodiment of the present invention is disclosed. The energy delivery device 10 (herein also described as the "device") 10, includes a large central drum 15, envisioned to be made of a hollow plastic material such that it floats partially submerged on the surface of water. The outer cylindrical surface of said drum 15 is provided with ridges 20 to capture movement from moving water such as waves, tides, flowing water and the like. The drum 15 is free to rotate on a central axle 25 (partially shown). The central axle 25 is then directly mechanically coupled in an in-line manner to two (2) air compressors 30, one (1) on either side of the drum 15.

The air compressors 30 are mounted to a frame assembly (34, 35, 36), envisioned to be manufactured from steel, aluminum, stainless steel or the like with a protective coating to prevent corrosion in a water-based environment. The frame assembly (34, 35, 36) includes a pair of frame bottom members 36, each having a first end attached to a bottom end of an individual frame side member 35. The pair of frame side members 35 are oriented parallel to each other. The top end of the pair of frame side members 35 are attached to an outer end of an individual frame upper member 34. The inner ends of the frame upper members 34 are conjoined with an anchor ring 40 to allow for tethering to a shore anchored object as will be depicted in greater detail herein below. The frame upper members 34 are each attached at an angle from the frame side members 35 (preferably approximately thirty degrees (30°)). The overall size of the drum 15 can vary per specific application; however, it is envisioned that a typically size would be approximately thirty-six inches (36 in.) long and eighteen inches (18 in.) in diameter. The specific size can be scaled up or down to meet the needs of a single individual or the needs of a large community.

Figure 2:
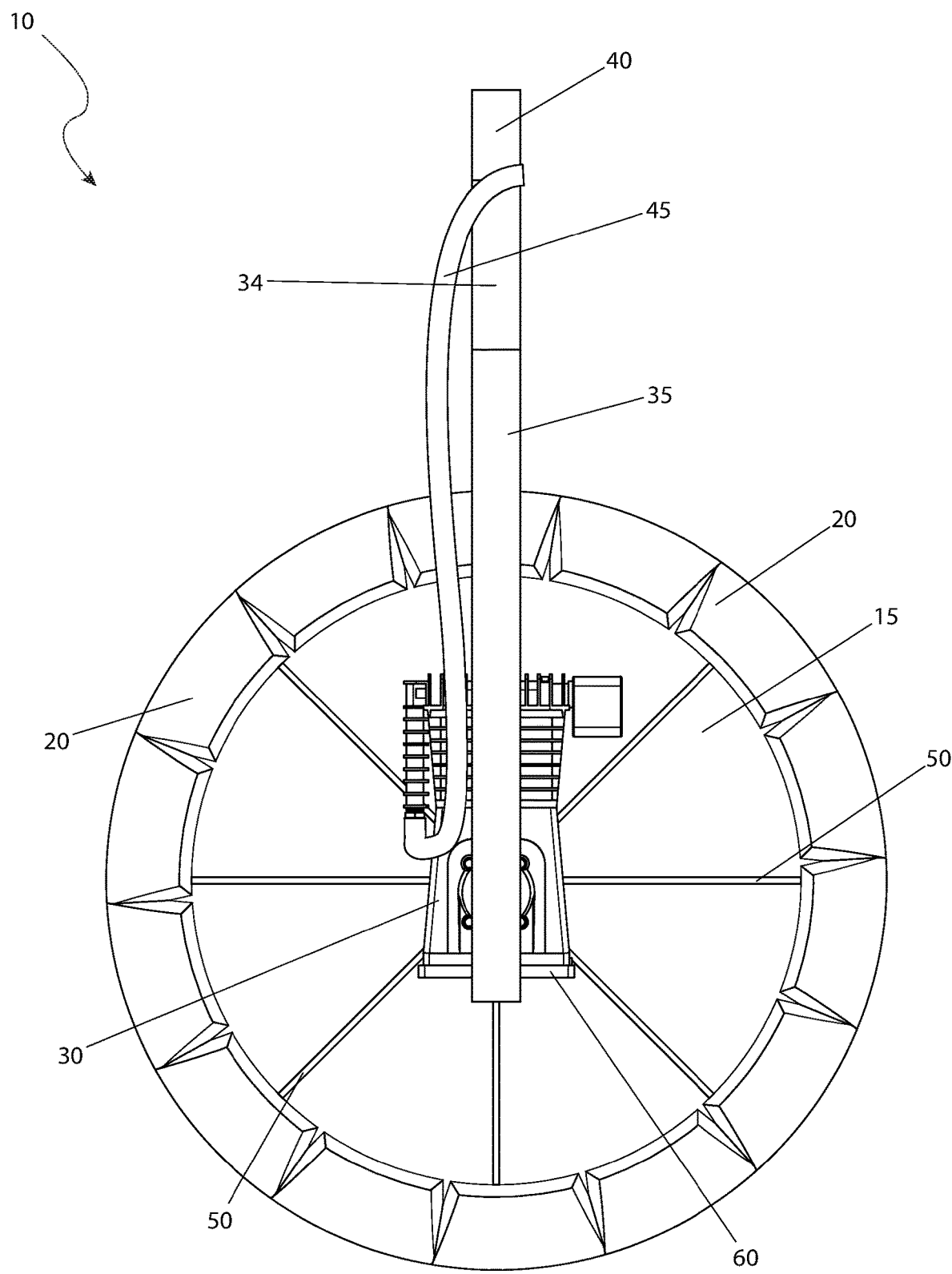
FIG. 2 is a side view of the energy delivery device 10, according to the preferred embodiment of the present invention.

Referring next to FIG. 2, a side view of the delivery device 10, according to the preferred embodiment of the present invention is depicted. It is noted that the supplied side view is symmetrical from either side of the device 10. The drum 15 with its integrally molded ridges 20, is centrally affixed to the main input shaft (not shown due to illustrative limitations) of the air compressors 30. A flexible compressed air hose 45 is routed from the output of each air compressor 30 to the top of the frame 35 near the anchor ring 40. Further information on the continued routing of the flexible compressed air hose 45 will be provided herein below. Reinforcing ribs 50 may be added on the interior or exterior of the drum side face 55 to afford greater structural stability. The air compressors 30 are each mounted to a base plate 60 located at the bottom thereof. The base plates 60 are subsequently mounted to an individual frame bottom member 36. This mounting is envisioned to be made by bolting or other method that allows for easy removal of the air compressors 30 in the event of repair or replacement.

Figure 3:
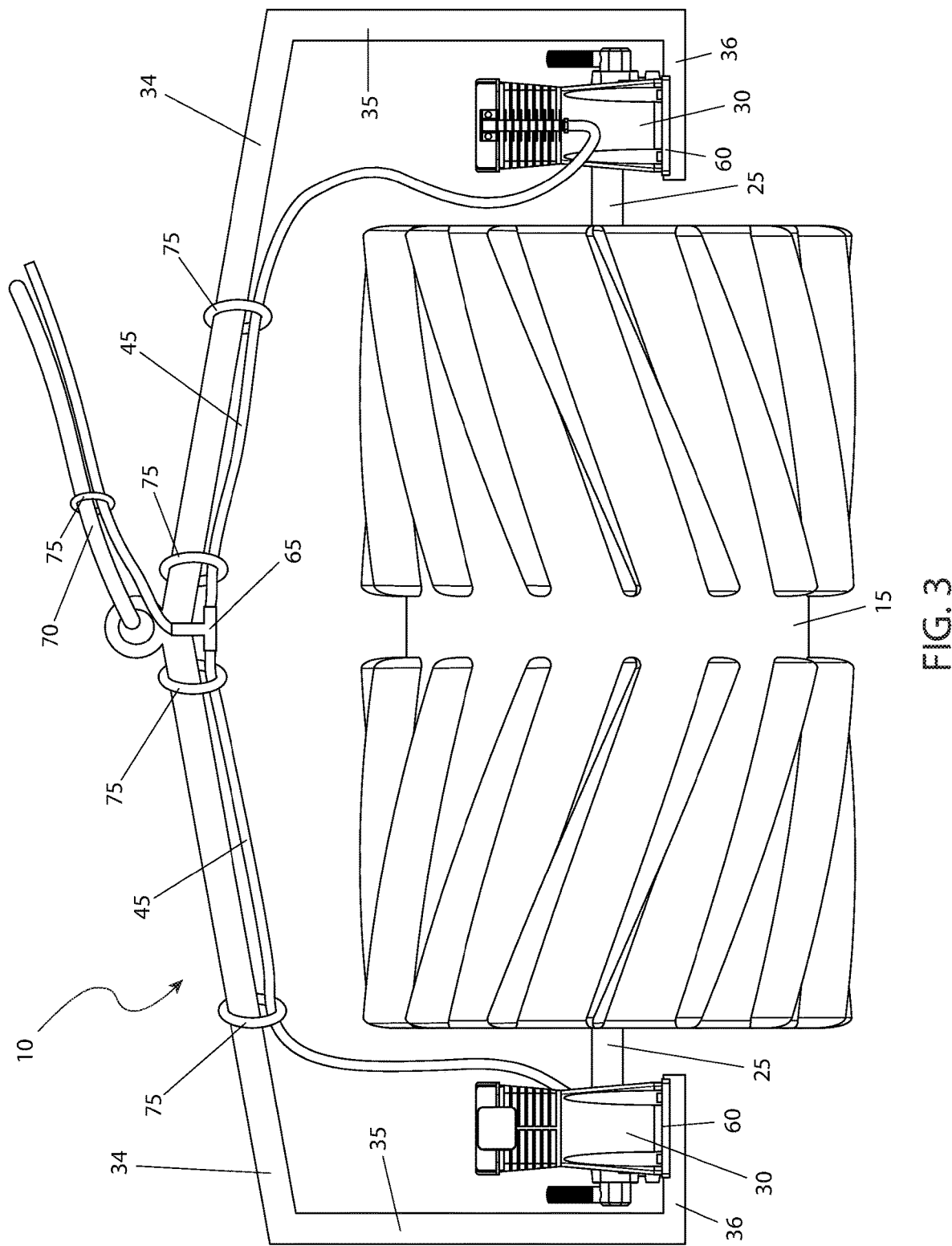
FIG. 3 is a sectional view of the energy delivery device 10 as seen along a line I-I, as shown in FIG. 1, according to the preferred embodiment of the present invention.

Referring now to FIG. 3, a sectional view of the device 10 as seen along a line I-I, as shown in FIG. 1, according to the preferred embodiment of the present invention is shown. This view provides confirmation of the symmetrical nature of the two (2) air compressors 30 in relation to the drum 15. The central axle 25 is visible originating at one (1) air compressor 30, traversing the interior of the drum 15, and terminating at the opposite air compressor 30. It is noted that interior components of the air compressors 30 are mirrored so as to both produce compressed air while a first air compressor 30 is driven in a clockwise manner and the second air compressor 30 is driven in a counter-clockwise manner. The flexible compressed air hose 45 from both air compressors 30 are routed to a tee fitting 65 near the anchor ring 40. The remaining side of the tee fitting 65 continues along a tethering line 70, such as a nylon rope. The flexible compressed air hose 45 is secured to the frame upper members 34 and the tethering line 70 via a series of securing means 75 such as nylon zip ties, stainless steel straps, or the like. Further description and clarification of the distal end of the flexible compressed air hose 45 and the tethering line 70 will be provided herein below.

Figure 4:
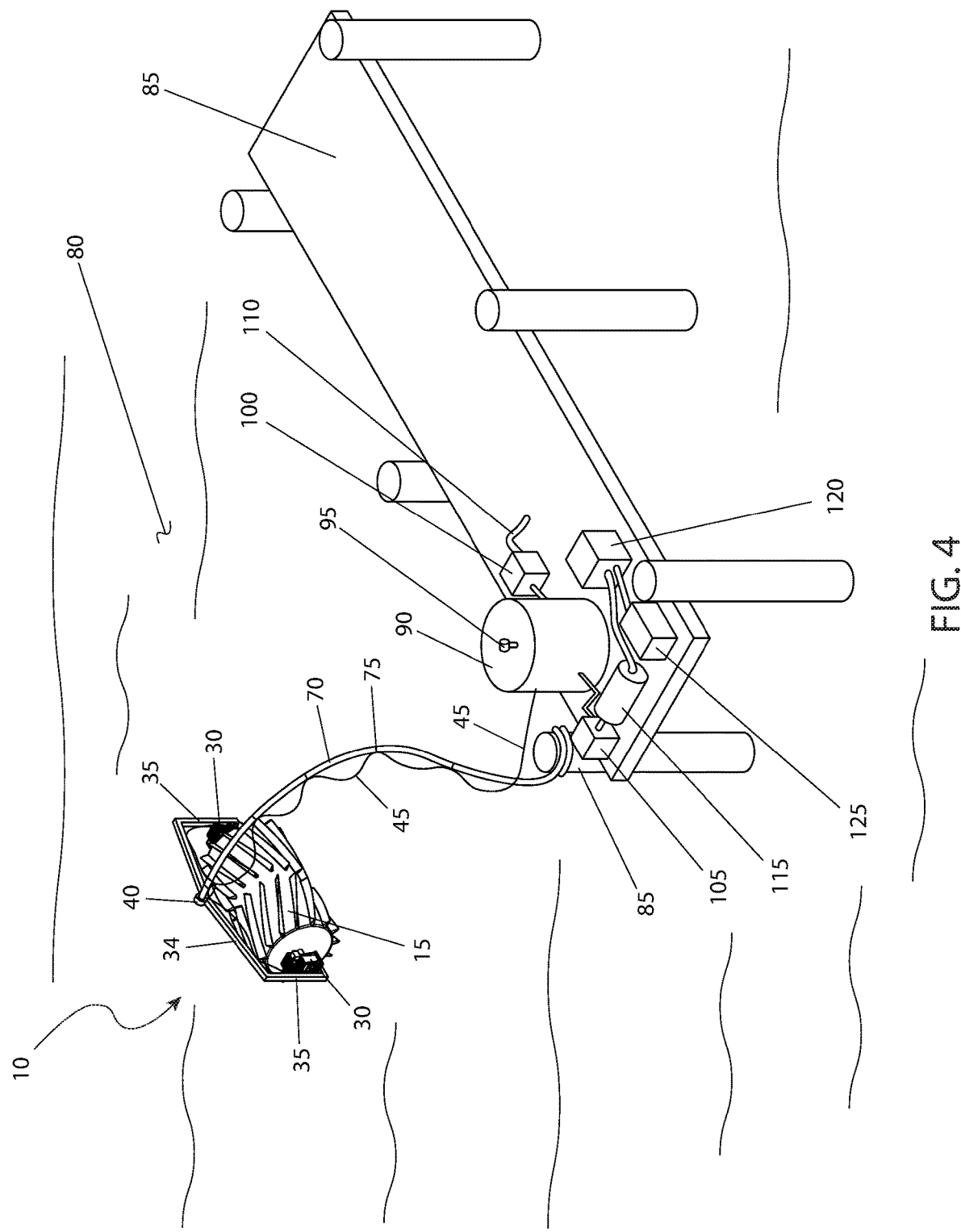
FIG. 4 is a perspective view of the energy delivery device 10 shown in a utilized state, according to the preferred embodiment of the present invention; and, FIG. 5 is a mechanical/electrical block diagram of the energy delivery device 10, according to the preferred embodiment of the present invention.

Referring next to FIG. 4, a perspective view of the device 10 shown in a utilized state, according to the preferred embodiment of the present invention id disclosed. The drum 15 and its attachments are located in a body of moving water 80 such as a lake, rivers, stream, ocean, bay, or the like and is tethered via the tethering line 70 to an stationary land object 85 such as stationary land object 85 such as a dock, mooring, pier, or the like. The flexible compressed air hose 45 is continually routed along the tethering line 70, secured, by securing means 75, and terminates at an air pressure tank 90. As such, air generated by the air compressors 30 (as shown in FIGS. 1, 2, and 3) is stored in the air pressure tank 90 for future use, and/or when the drum 15 is not rotating such as when the body of moving water 80 is calm. The quantity of air pressure can be verified by an air pressure gauge 95. The resultant air pressure is then piped to air delivery station 100 and an air driven motor 105. The air delivery station 100 is provided with a flexible hose 110 for delivery of pressurized air for purposes included, but not limited to: inflating tires, inflating water toys, operating air powered tools, and the like.

The rotational mechanical power output of the air driven motor 105 is then used to drive an electrical generator 115. The electrical power output of the electrical generator 115 is then routed to an electrical power delivery station 120 which is envisioned to produce both AC and DC power for usage such as operating electrical lights, electrical power equipment, charging personal electronics and the like. DC power output is also directed to a storage battery 125 to allow for stored electrical energy when the air driven motor 105 and the electrical generator 115 is not operational. Thus, the overall system presented by the device 10 allows for water movement/motion in the body of moving water 80 to rotate the drum 15 and thus the two (2) air compressors 30 to produce pressurized air which is then stored in the air pressure tank 90 for direct usage by the air delivery station 100, or for conversion to electrical power by the air driven motor 105, for any electrical usage needed. The air and electrical power are provided independently of any grid connected power and is thus ideal for use in remote locations, off-grid locations, emergency situations, and the like.

Figure 5:
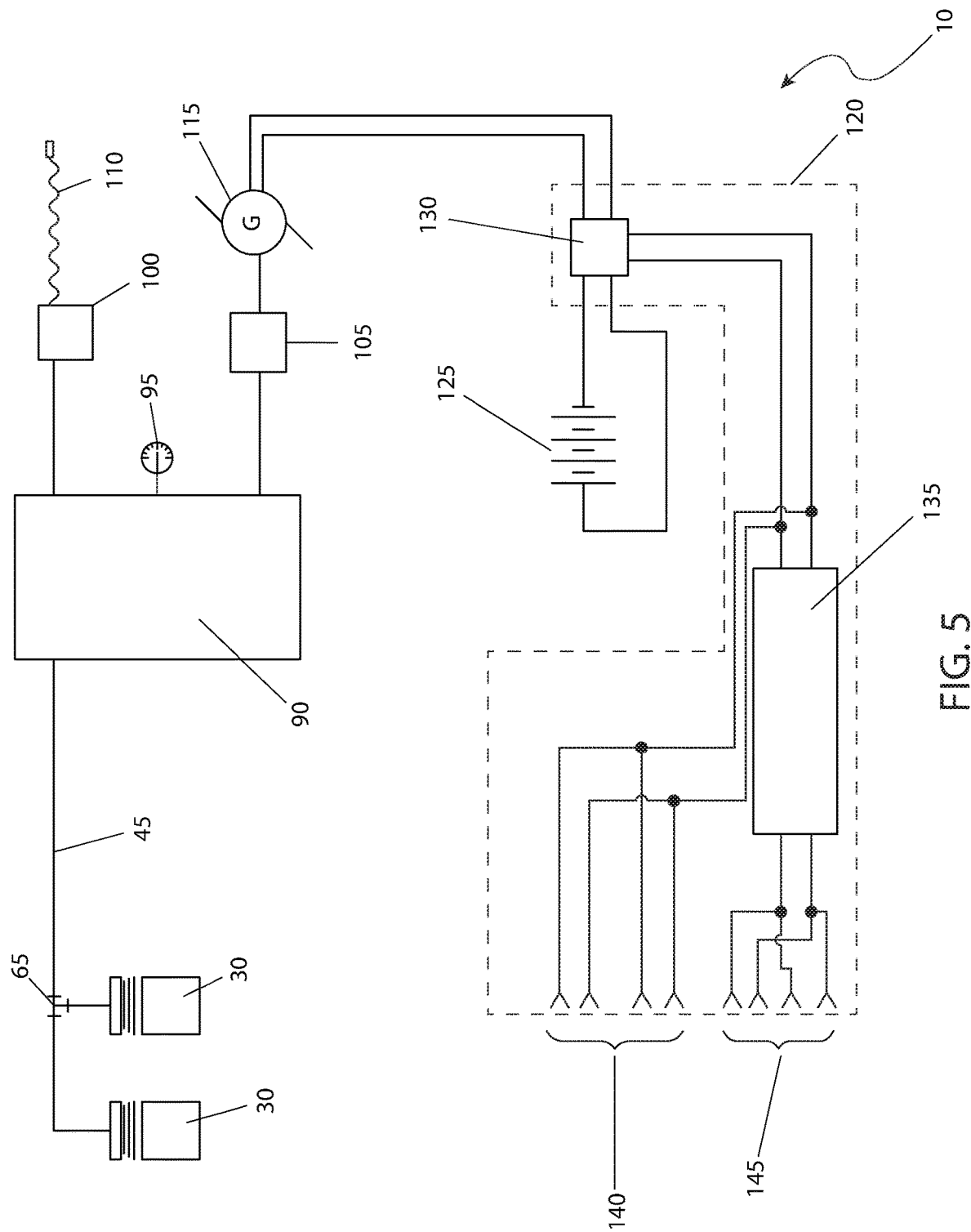

Referring to FIG. 5, a mechanical/electrical block diagram of the device 10, according to the preferred embodiment of the present invention is depicted. Power generation begins at the two (2) air compressors 30 (as driven by the drum 15, as shown in FIG. 1) and combined together at the tee fitting 65, and delivered via the flexible compressed air hose 45 to the air pressure tank 90, where pressure levels can be monitored on the air pressure gauge 95. Resultant pressurized air from the air pressure tank 90 is then delivered to the air delivery station 100 and the air driven motor 105 simultaneously. The air delivery station 100 allows for local use of the flexible hose 110 as described above. The air driven motor 105 drives the electrical generator 115 which converts rotational power to electrical power. The resultant electrical power is then delivered to a charge controller 130 in the electrical power delivery station 120. The charge controller 130 maintains power to and from the storage battery 125 depending on the needs of any local users as well as the state of charge of the storage battery 125. The charge controller 130 is well-known in the art and not within the scope of the present invention. The charge controller 130 also delivers DC power to an inverter 135 which produces AC power. The inverter 135 is well-known in the art and not within the scope of the present invention. The DC power and the AC power is made available at DC power receptacles 140 and AC power receptacles 145 respectively on the face of the electrical power delivery station 120 for local use.

2. Operation of the Preferred Embodiment

The preferred embodiment of the present invention can be utilized by the common user in a simple and effortless manner with little or no training. It is envisioned that the water powered device 10 would be constructed in general accordance with FIG. 1 through FIG. 5. The user would procure the device 10 from conventional procurement sources such as alternate energy supply houses, mail order supply houses, internet supply houses and the like. Special attention would be paid to the overall physical size of the device 10, its intended usage, pressure and power delivery capabilities, and the like. It is envisioned that all components could be purchased in a kit format, or specialized components could be purchased individually, with installation with off-the-shelf components provided and installed by the end user.

After procurement and prior to utilization, the device 10 would be installed in the following manner: the drum 15, the central axle 25, the air compressors 30, the frame assembly (34, 35, 36), the flexible compressed air hose 45, and the tethering line 70 would be tethered in a body of moving water as shown in FIG. 4, air pressure connections would be made between the flexible compressed air hose 45, the air pressure tank 90, the air delivery station 100, and the air driven motor 105 as shown in FIG. 4 and FIG. 5. Electrical connections would be made between the electrical generator 115, the electrical power delivery station 120, and the storage battery 125. At this point in time, the device 10 is ready for utilization.

During utilization of the device 10, the following procedure would be initiated: for access to pressurized air, the user would access the flexible hose 110 of the flexible hose 110 for purposes included but not limited to inflating tires, inflating water toys, operating air powered tools, and the like. For access to AC or DC electrical power, the user would access the AC power receptacles 145 and the DC power receptacles 140 respectively on the electrical power delivery station 120.

Such usage of the device 10 is envisioned to occur provided adequate water motion is always present on the body of moving water 80. Short term lack of movement can be overcome by the pressure storage capability of the air pressure tank 90, as well as the electrical storage capability of the storage battery 125. This usage is ideal for use at remote locations, off-grid location, emergency usage, or anywhere where a body of moving water 80 is present to increase energy independency.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An energy delivery device, comprising:
a large central drum floating partially submerged on a water surface, an outer cylindrical surface of the drum is provided with a plurality of ridges to capture movement from moving water;
a central axle receiving the large central drum allowing the large central drum to rotate on freely the central axle, the central axle originating at a first air compressor traversing the interior of the drum and terminating at a second air compressor;
the first air compressor and the second air compressor comprising a pair of air compressors directly mechanically coupled in an in-line manner to the central axle, the air compressors are each mounted to a base plate located at the bottom thereof, each base plate is subsequently mounted to an individual frame bottom member;
a frame assembly mounting the pair of air compressors, the frame assembly includes a pair of frame bottom members, each of the pair of frame bottom members having a first end attached to a bottom end of an individual frame side member, the top end of the pair of individual frame side members are attached to an outer end of an individual frame upper member, an inner end of each of the frame upper members are conjoined with an anchor ring to allow for tethering to a shore anchored object;
a flexible compressed air hose routed from an output of each of the pair of air compressor to a top of the frame assembly adjacent the anchor ring, the flexible compressed air hose from both of the air compressors are routed to a tee fitting adjacent the anchor ring; and
wherein the large central drum is located on the body of moving water and is tethered via the tethering line to an stationary land object, the flexible compressed air hose is continually routed along the tethering line, secured, and terminates at an air pressure tank, air generated by the air compressors is stored in the air pressure tank for future use, and/or when the large central drum is not rotating when the body of moving water is calm.

2. The energy delivery device according to claim 1, further comprising a first plurality of reinforcing ribs are added on an interior of a drum side face to afford greater structural stability.

3. The energy delivery device according to claim 2, wherein a second plurality of reinforcing ribs are added on an exterior of the drum side face to afford greater structural stability.

4. The energy delivery device according to claim 1, wherein the large central drum is made of a hollow plastic material.

5. The energy delivery device according to claim 1, wherein the large central drum is in the range of 18 inches to 36 inches in diameter.

6. The energy delivery device according to claim 1, wherein each said base plates is mounted to the individual frame bottom member by bolting that allows for easy removal of the air compressors in the event of repair or replacement.

7. The energy delivery device according to claim 1, wherein the pair of compressors are individually coupled on both sides of the large central drum.

8. The energy delivery device according to claim 1, wherein a plurality of interior components of the air compressors are mirrored so as to both produce compressed air while the first air compressor is driven in a clockwise manner and the second air compressor is driven in a counterclockwise manner.

9. The energy delivery device according to claim 1, wherein the pair of frame side members are oriented parallel to each other.

10. The energy delivery device according to claim 1, wherein the frame upper members are each attached at an angle from the frame side members at thirty degrees.

11. The energy delivery device according to claim 1, wherein the frame assembly includes a protective coating to prevent corrosion in a water-based environment.

12. The energy delivery device according to claim 11, wherein the frame assembly is made of material selected from the group consisting of steel material, aluminum material, or stainless steel material.

13. The energy delivery device according to claim 1, wherein the tee fitting continues along a tethering line.

14. The energy delivery device according to claim 13, wherein the tethering line is a nylon rope.

15. The energy delivery device according to claim 1, wherein the flexible compressed air hose is secured to the frame upper members and the tethering line via a plurality of nylon zip ties.

16. The energy delivery device according to claim 1, wherein the flexible compressed air hose is secured to the frame upper members and the tethering line via a plurality of stainless steel straps.

17. The energy delivery device according to claim 1, wherein the flexible compressed air hose is continually routed along the tethering line, secured by a securing means, and terminates at the air pressure tank.

18. The energy delivery device according to claim 17, wherein air generated by the air compressors is stored in the air pressure tank for future use, and/or when the drum is not rotating when the body of moving water is calm.

19. The energy delivery device according to claim 1, further comprising a quantity of air pressure is verified by an air pressure gauge and the resultant air pressure is then piped to an air delivery station and an air driven motor, the air delivery station is provided with a flexible hose for delivery of pressurized air, rotational mechanical power output of the air driven motor is then used to drive an electrical generator.

20. The energy delivery device according to claim 19, wherein the electrical power output of the electrical generator is then routed to an electrical power delivery station which produces both AC and DC power for usage, the DC power output is also directed to a storage battery to allow for stored electrical energy when the air driven motor and the electrical generator is not operational.

* * * * *